United States Patent
Han et al.

(10) Patent No.: US 11,323,301 B2
(45) Date of Patent: May 3, 2022

(54) METHOD AND DEVICE FOR TRANSMITTING OR RECEIVING SUPERPOSITION CODING SIGNAL BY USING DEVICE-TO-DEVICE COMMUNICATION IN WIRELESS COMMUNICATION SYSTEM

(71) Applicant: LG ELECTRONICS INC., Seoul (KR)

(72) Inventors: Sangwook Han, Seoul (KR); Sangrim Lee, Seoul (KR); Gwanmo Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 16/764,723

(22) PCT Filed: Nov. 15, 2017

(86) PCT No.: PCT/KR2017/012951
§ 371 (c)(1),
(2) Date: May 15, 2020

(87) PCT Pub. No.: WO2019/098403
PCT Pub. Date: May 23, 2019

(65) Prior Publication Data
US 2021/0184909 A1    Jun. 17, 2021

(51) Int. Cl.
*H04L 5/00* (2006.01)
*H04L 27/26* (2006.01)
(Continued)

(52) U.S. Cl.
CPC ...... *H04L 27/26136* (2021.01); *H04L 5/0048* (2013.01); *H04L 27/262* (2013.01); *H04W 88/04* (2013.01); *H04W 92/18* (2013.01)

(58) Field of Classification Search
CPC ............. H04L 27/26136; H04L 5/0048; H04L 27/262; H04L 5/04; H04L 27/3488; H04W 88/04; H04W 92/18; H04W 28/02
See application file for complete search history.

(56) References Cited

U.S. PATENT DOCUMENTS

2016/0192420 A1* 6/2016 Kim .................... H04W 74/002
                                                    370/329
2017/0164232 A1* 6/2017 Maric .................. H04W 28/06
(Continued)

FOREIGN PATENT DOCUMENTS

| KR | 20080084409 | 9/2008 |
|----|-------------|--------|
| WO | 2017/018671 | 2/2017 |
| WO | 2017/034329 | 3/2017 |

OTHER PUBLICATIONS

PCT International Application No. PCT/KR2017/012951, International Search Report dated Aug. 14, 2020, 15 pages.
(Continued)

*Primary Examiner* — Lan-Huong Truong
(74) *Attorney, Agent, or Firm* — Lee Hong Degerman Kang & Waimey

(57) ABSTRACT

The present application discloses a method for transmitting an uplink relay signal by a relay terminal in a wireless communication system. Specifically, the method comprises the steps of: superposition encoding relay data and side link data according to a predetermined power ratio so as to generate the uplink relay signal; and transmitting the uplink relay signal and a superposition encoding-specific reference signal sequence corresponding to the power ratio to a base station and a target terminal.

10 Claims, 10 Drawing Sheets

(51) Int. Cl.
*H04W 88/04* (2009.01)
*H04W 92/18* (2009.01)

(56) References Cited

U.S. PATENT DOCUMENTS

| 2018/0054339 A1* | 2/2018 | Sun | H04L 27/22 |
| 2018/0213379 A1* | 7/2018 | Xiong | H04W 40/22 |
| 2018/0262288 A1* | 9/2018 | Gao | H04J 11/004 |

OTHER PUBLICATIONS

Huawei et al., "On power allocation for MUST Case 1&2," 3GPP TSG RAN WG1 Meeting #87, R1-1611189, Reno, USA, Nov. 14-18, 2016, 5 pages.

Qualcomm Incorporated, "EPRE Computation for MUST Case 1 and Case 2," 3GPP TSG RAN WG1 Meeting #87, R1-1611606, Reno, Nevada, USA, Nov. 14-18, 2016, 3 pages.

\* cited by examiner (A) CONTROL-PLANE PROTOCOL STACK (B) USER-PLANE PROTOCOL STACK & # METHOD AND DEVICE FOR TRANSMITTING OR RECEIVING SUPERPOSITION CODING SIGNAL BY USING DEVICE-TO-DEVICE COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2017/012951, filed on Nov. 15, 2017, the contents of which are all hereby incorporated by reference herein in its entirety.

TECHNICAL FIELD

The present disclosure relates to a wireless communication system and, more particularly, to a method of transmitting and receiving a superposition coding signal using direct device-to-device communication in a wireless communication system, and an apparatus therefor.

BACKGROUND ART

As an example of a mobile communication system to which the present disclosure is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DETAILED DESCRIPTION OF THE DISCLOSURE

Technical Problems

A method of transmitting and receiving a superposition coding signal using direct device-to-device communication in a wireless communication system, and an apparatus therefor will be proposed below based on the above-described discussion.

Technical Solutions

According to an aspect of the present disclosure, provided herein is a method of transmitting an uplink relay signal by a relay user equipment (UE) in a wireless communication system, including generating the uplink relay signal by superposition-encoding relay data and sidelink data according to a predetermined power ratio; and transmitting a superposition encoding specific reference signal sequence related with the power ratio and the uplink relay signal to a base station (BS) and a target UE.

In another aspect of the present disclosure, provided herein is a relay user equipment (UE) in a wireless communication system, including a wireless communication module; and a processor connected to the wireless communication module, wherein the processor generates an uplink relay signal by superposition-encoding relay data and sidelink data according to a predetermined power ratio, and transmits a superposition encoding specific reference signal sequence related with the power ratio and the uplink relay signal to a base station (BS) and a target UE.

The relay data may be decoded by the BS from the uplink relay signal using the power ratio related with the superposition encoding specific reference signal sequence. The sidelink data may be decoded by the target UE from the uplink relay signal using the power ratio related with the superposition encoding specific reference signal sequence.

The relay UE may receive the relay data from a primary UE, and then transmit a relay specific reference signal sequence and the relay data to the BS based on absence of the sidelink data to be transmitted to the target UE on sidelink. Information about a combination of the relay specific reference signal sequence and the superposition encoding specific reference signals sequence may be received from the BS.

The relay UE may select one superposition encoding specific reference signal sequence related with the power ratio from among two or more superposition encoding specific reference signal sequences.

Advantageous Effects

According to embodiments of the present disclosure, a superposition coded signal may be more efficiently transmitted and received using direct device-to-device communication in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE DISCLOSURE

Hereinafter, structures, operations, and other features of the present disclosure will be readily understood from the embodiments of the present disclosure, examples of which are illustrated in the accompanying drawings. Embodiments which will be described hereinbelow are examples in which technical features of the present disclosure are applied to a 3GPP system.

Although the embodiments of the present disclosure will be described based on an LTE system and an LTE-advanced (LTE-A) system, the LTE system and the LTE-A system are purely exemplary and the embodiments of the present disclosure can be applied to any communication system corresponding to the aforementioned definition. In addition, although the embodiments of the present disclosure will be described based on frequency division duplexing (FDD), the FDD mode is purely exemplary and the embodiments of the present disclosure can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
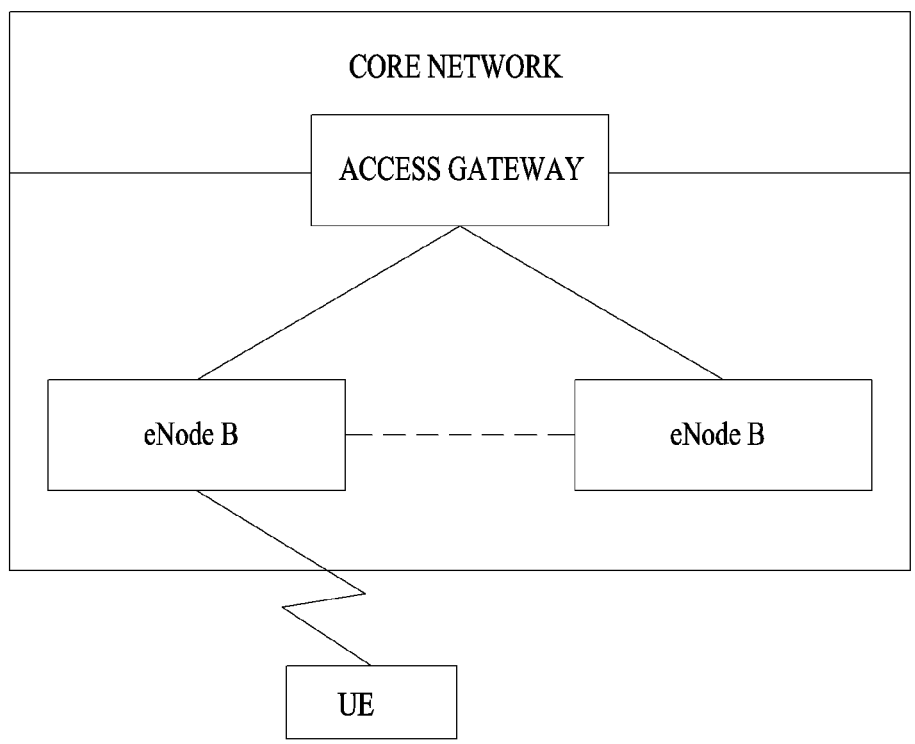
FIG. 1 is a diagram schematically illustrating a network structure of an evolved universal mobile telecommunications system (E-UMTS) as an exemplary radio communication system.
Figure 2:
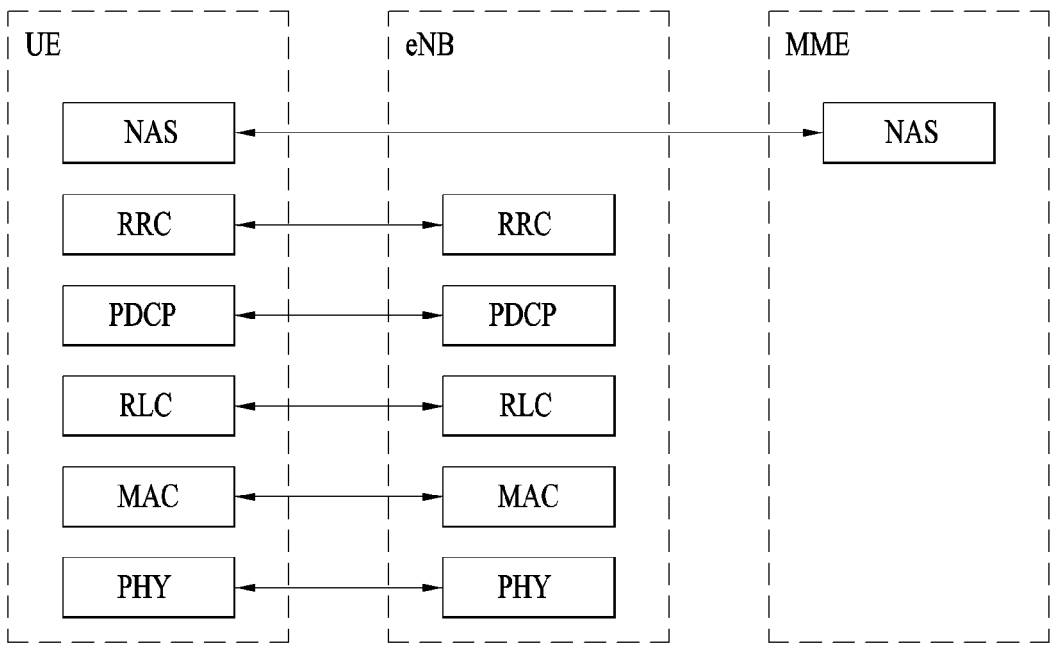
FIG. 2 is a diagram illustrating structures of a control plane and a user plane of a radio interface protocol between a UE and an evolved UMTS terrestrial radio access network (E-UTRAN) based on the 3GPP radio access network specification.
Figure 2:
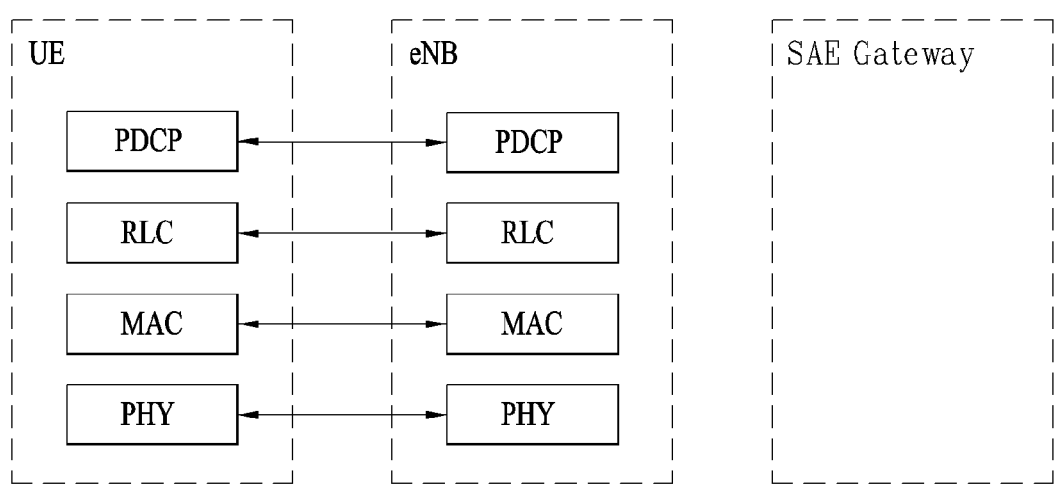

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A single cell managed by an eNB is configured to operate in one of the bandwidths of 1.25, 2.5, 5, 10, 15 and 20 Mhz and provide downlink (DL) or uplink (UL) transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
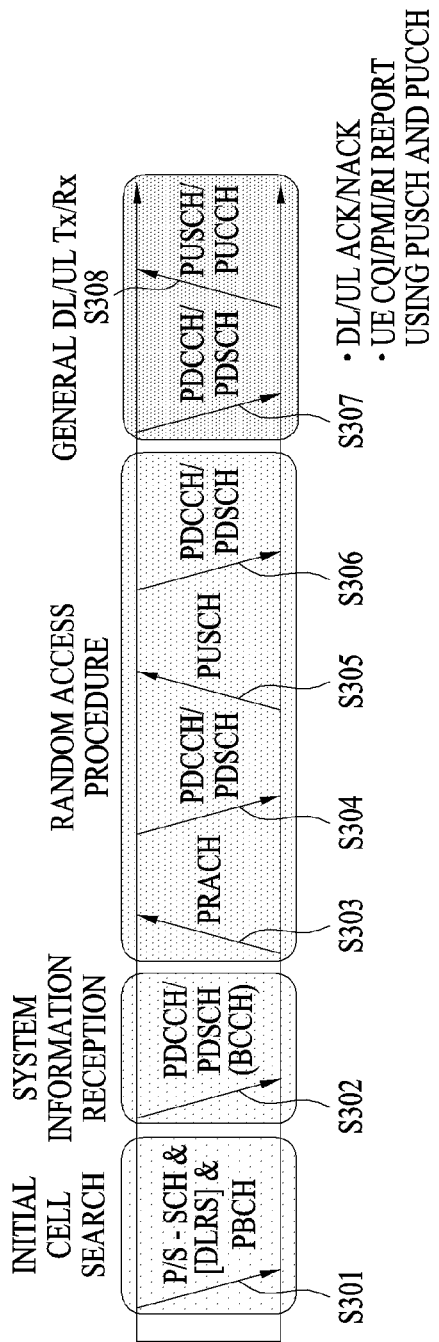
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
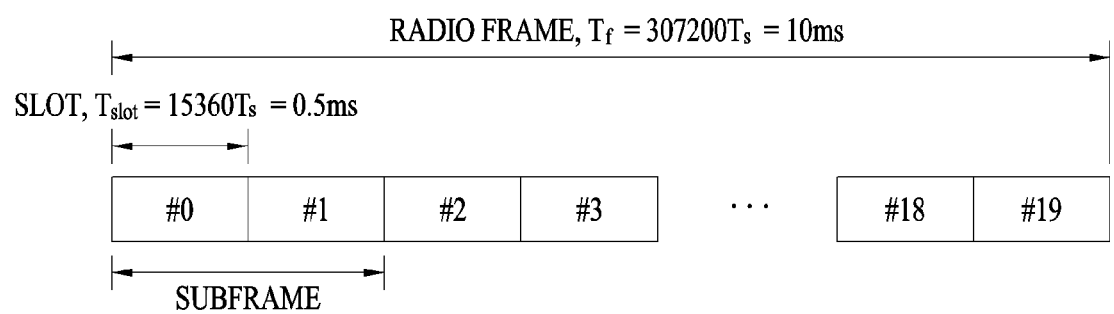
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×$10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
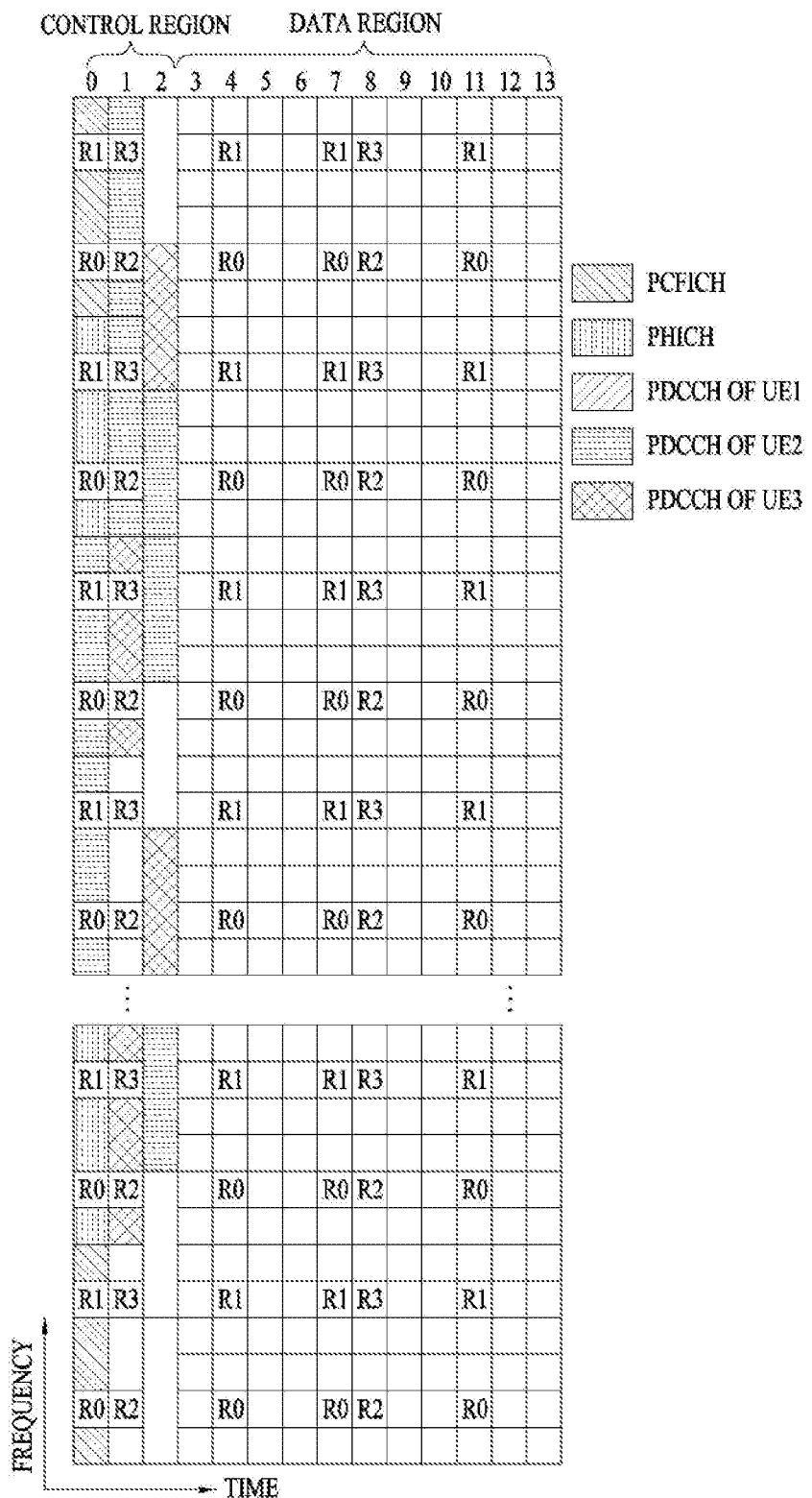
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
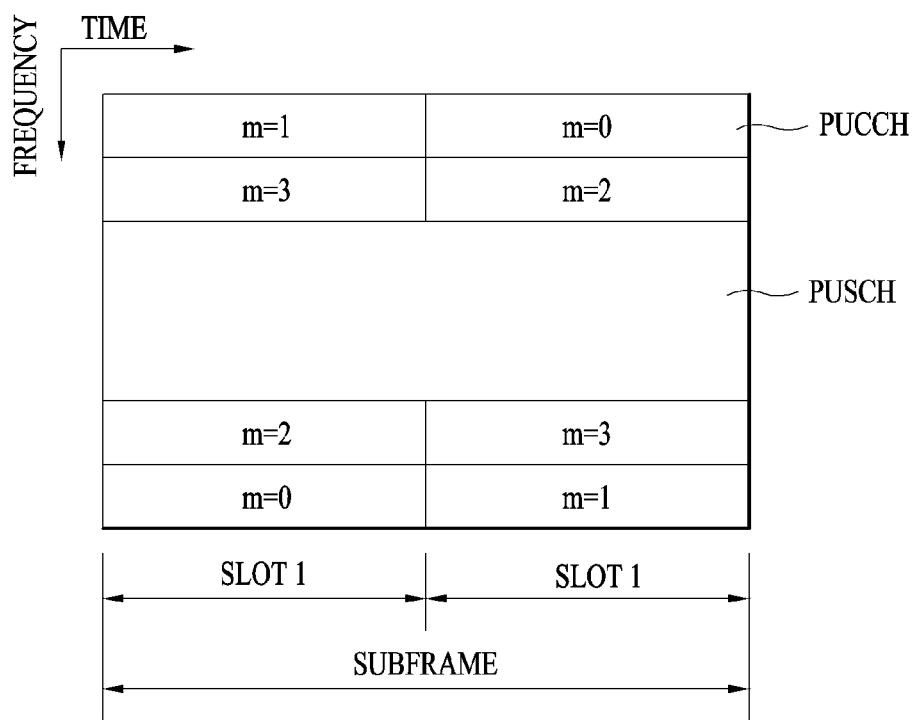
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Figure 7:
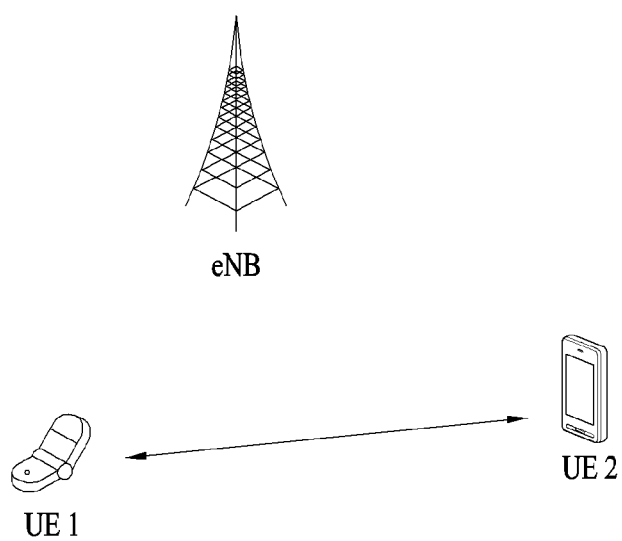
FIG. 7 is a diagram illustrating the concept of direct device-to-device (D2D) communication.

FIG. 7 is a diagram illustrating the concept of direct device-to-device (D2D) communication.

Referring to FIG. 7, in D2D communication in which a UE performs direct radio communication with another UE, i.e., in direct D2D communication, an eNB may transmit a scheduling message for indicating D2D transmission and reception. UEs participating in D2D communication receive the D2D scheduling message from the eNB and perform a transmission and reception operation indicated by the D2D scheduling message. Here, although the UE means a terminal of a user, if a network entity such as the eNB transmits and receives a signal according to a communication scheme between UEs, the network entity may also be regarded as the UE. Hereinbelow, a link directly connected between UEs will be referred to as a D2D link or a sidelink.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

If a transmitter has $N_T$ transmit (Tx) antennas and a receiver has $N_R$ receive (Rx) antennas, use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \qquad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, $N_T$ transmission signals $x_1, x_2, \ldots, x_{N_T}$ to be actually transmitted may be configured by multiplying the transmission power-controlled information vector S by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R)$$ [Equation 6]

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$ [Equation 7]

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Hereinafter, an RS, particularly, a demodulation RS (DM-RS), will be described in more detail.

A DM-RS for a PUSCH may be defined by Equation 8.

$$r^{PUSCH}(m \cdot M_{sc}^{RS} + n) = r_{u,v}^{(\alpha)}(n)$$ [Equation 8]

In Equation 8, $m=0,1$, $n=0, \ldots, M_{sc}^{RS}-1$, and $M_{sc}^{RS} = M_{sc}^{PUSCH}$.

A cyclic shift value $\alpha$ in a slot may be defined as in Equation 9 and $n_{cs}$ may be defined as in Equation 10.

$$\alpha = 2\pi \frac{n_{cs}}{12}$$ [Equation 9]

$$n_{cs} = (n_{DMRS}^{(1)} + n_{DMRS}^{(1)} + n_{PRS}(n_s)) = \text{mod}12$$ [Equation 10]

In Equation 10, $n_{DMRS}^{(1)}$ is indicated by a parameter cyclicShift transmitted by a higher layer. Table 1 shows an example of a correspondence relationship between the parameter value and $n_{DMRS}^{(1)}$.

TABLE 1

| Parameter | $n_{DMRS}^{(1)}$ |
|---|---|
| 0 | 0 |
| 1 | 2 |
| 2 | 3 |
| 3 | 4 |
| 4 | 5 |
| 5 | 8 |
| 6 | 0 |
| 7 | 10 |

In Equation 10, $n_{DMRS}^{(2)}$ may be defined by a cyclic shift field in DCI format 0 for a transport block corresponding to PUSCH transmission. A DCI format is transmitted on a PDCCH. The cyclic shift field may have a length of 3 bits.

Table 2 shows an example of a correspondence relationship between the cyclic shift field and $n_{DMRS}^{(2)}$.

TABLE 2

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

If a PDCCH including DCI format 0 is not transmitted in the same transport block, if the first PUSCH is semi-persistently scheduled in the same transport block, or if the first PUSCH is scheduled by a random access response grant in the same transport block, $n_{DMRS}^{(2)}$ may be 0.

A DM-RS sequence $r^{PUSCH}(\cdot)$ is multiplied by an amplitude scaling factor $\beta_{PUSCH}$ and is mapped in sequence starting with $r^{PUSCH}(0)$ to a physical transport block used for corresponding PUSCH transmission. For a normal cyclic prefix (CP), the DM-RS sequence is mapped to the fourth SC-FDMA symbol (SC-FDMA symbol index 3) in one slot and, for an extended CP, the DM-RS sequence is mapped to the third SC-FDMA symbol (SC-FDMA symbol index 2) in one slot.

Orthogonal cover codes (OCCs) may be applied to DM-RS sequences. OCCs refer to mutually orthogonal codes applicable to sequences. Generally, although different sequences may be used to distinguish between a plurality of channels, the channels may be distinguished using OCCs. OCCs may be used for the following usages.

1) OCCs may be applied in order to increase the capacity of radio resources allocated to UL RSs, i.e., DM-RSs. For example, when a cyclic shift a is allocated to DM-RSs transmitted in first and second slots, a negative-signed (−) DM-RS may be allocated to the second slot. That is, a first UE may transmit a positive-signed (+) DM-RS with the cyclic shift a in the second slot, whereas a second UE may transmit a negative-signed (−) DM-RS with the cyclic shift a in the second slot. The eNB may estimate the channel of the first user by adding the DM-RS transmitted in the first slot and the DM-RS transmitted in the second slot.

The eNB may estimate the channel of the second user by subtracting the DM-RS transmitted in the second slot from the DM-RS transmitted in the first slot. That is, the eNB may distinguish between the DM-RS transmitted by the first user and the DM-RS transmitted by the second user by applying OCCs. Accordingly, as at least two users may use the same DM-RS sequence with different OCCs, the capacity of radio resources may be doubled.

For transmission of a DM-RS to which an OCC is applied, a field indicating the applied OCC may be included in a DL control signal. For example, assuming that a 1-bit OCC indicator field is allocated to the DL control signal, the OCC indicator may be indicated as in Table 3 below.

TABLE 3

|   | 1$^{st}$ slot | 2$^{nd}$ slot |
|---|---|---|
| 0 | 1 | 1 |
| 1 | 1 | −1 |

Referring to Table 3, if the OCC indicator is set to 0, a positive sign (+) is applied to the DM-RS transmitted in the second slot and, if the OCC indicator is set to 1, a negative sign (−) is applied to the DM-RS transmitted in the second slot.

OCCs may be used to increase the spacing between cyclic shifts allocated to multiple antennas or layers of a single user. While the following description is given of cyclic shifts allocated to multiple layers, the same principle may be applied to cyclic shifts allocated to multiple antennas.

Hereinafter, a multi-user superposition transmission (MUST) scheme will be described.

MUST refers to a multiple access scheme that may achieve high bandwidth efficiency by allocating a plurality of UEs to the same frequency-time resources using a preset power ratio and mitigating preset inter-user interference through an interference cancellation receiver, basically based on the premise that a signal is transmitted to the interference cancellation receiver, in addition to resource allocation in the frequency-time domain in a legacy OFDMA system. MUST is under discussion as a significant candidate technology for a future 5th generation (5G) system.

Resource allocation of the eNB and interference cancellation of the UE are important techniques in the MUST system. Particularly, receivers may be classified into symbol-level interference cancellation (SIC) receivers represented by a maximum likelihood (ML) receiver, and codeword-level interference cancellation (CWIC) receivers represented by a minimum mean-square error (MMSE)-based linear CWIC (L-CWC) receiver and an ML-CWIC receiver, depending on interference cancellation schemes of the UE. Reception gain is different in a given environment according to each interference cancellation scheme. In general, the ML receiver and the CWIC receiver achieve high gain in proportion to the implementation complexity of the UE.

DL data is transmitted to a plurality of UEs using the same time and the same frequency through the MUST scheme. In this case, a near UE located near an eNB and having excellent geometry and a far UE far from the eNB pair with each other to receive a DL service. Power exceeding half of the total power is used for the far UE and some of the remaining power is used for the near UE.

The far UE is partially subjected to interference by data of the near UE. However, since transmit power of the data of the near UE is significantly weaker than that of the far UE and the level of interference is decreased due to high path loss, the far UE may receive data without advanced interference cancellation (IC) such as symbol-level interference cancellation (SLIC)/ML/CWIC. In contrast, since the near UE receives significant interference from the far UE, the near UE reduces interference using interference cancellation (IC) such as SLIC/ML/CWIC and then receives data.

Figure 8:
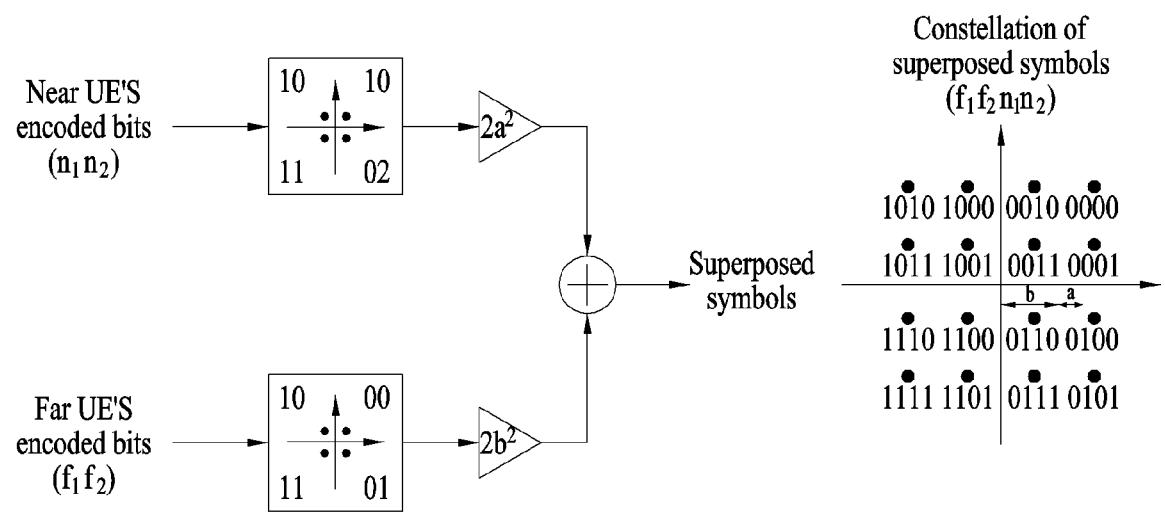
FIG. 8 illustrates an example of one of transmission schemes of a MUST system.

In a MUST system, various transmission schemes may be used. FIG. 8 is a diagram illustrating one of transmission schemes of a MUST system.

Referring to the left side of FIG. 8, information bits, which are the data of a near UE, and information bits, which are the data of a far UE, are converted into coded bits through respective channel coding. Thereafter, the coded bits of each UE pass through each modulator to generate constellation symbols of the near UE and the far UE. Next, power is appropriately allocated to each constellation symbol and the two constellation symbols are combined to generate one superposed symbol.

For example, if it is assumed that the coded bits of the near UE and the coded bits of the far UE are 00 and 11, respectively, the constellation symbol of each UE is generated through QPSK modulation and power is allocated to the constellation symbol of each UE. Thereafter, two QPSK symbols are combined to generate one superposed symbol. The generated superposed symbol is illustrated on the right side of FIG. 8 and the superposed symbol is subjected to layer mapping and precoding and is transmitted through an eNB antenna.

Hereinbelow, a method of transmitting and receiving a superposition encoding signal, i.e., a MUST signal, through sidelink in a wireless communication system according to the present disclosure will be described. More specifically, a method is proposed of transmitting, by a UE, data to a counterpart UE of sidelink communication through cooperative relay using direct D2D communication, i.e., sidelink communication, and superposition coding, i.e., a MUST scheme, while relaying data of another user having an inferior channel environment using cellular communication.

Figure 9:
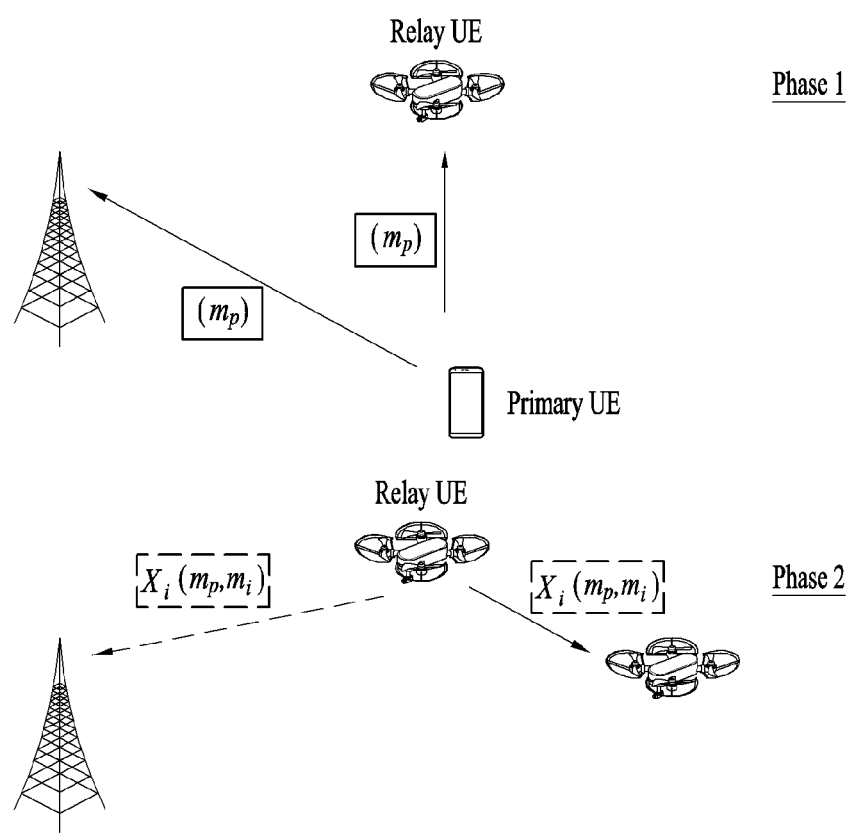
FIG. 9 illustrates an example of cooperative relay according to the present disclosure.

FIG. 9 illustrates an example of cooperative relay according to the present disclosure. Particularly, a method in which a relay UE cooperatively relays UL transmission of a primary UE and, at the same time, transmits sidelink data thereof to another relay UE is illustrated.

Referring to FIG. 9, in Phase 1, the primary UE transmits a message $m_p$ to the eNB and the relay UE and, in Phase 2, the relay UE transmits a message $X_i(m_r, m_p)$ obtained by superposition-coding a message of the primary UE and a message for sidelink communication using a MUST scheme.

However, a situation in which the relay UE does not have data to be transmitted to a target UE of sidelink needs to be considered. The eNB and the target UE should recognize whether a signal transmitted by the relay UE includes a sidelink data signal, i.e., whether the signal transmitted by the relay UE corresponds to MUST transmission. Accordingly, when the eNB, the relay UE, and the target UE are paired, the following two transmissions need to be distinguished.

simultaneous transmission through MUST from the relay UE to the eNB and the target UE transmission from the relay UE only to the eNB The present disclosure proposes that the relay UE select a DM-RS by a method agreed on with the eNB and the target UE so that the eNB and the target UE may distinguish whether transmission is a MUST mode or transmission only to the eNB through the DM-RS.

First Embodiment

A first embodiment of the present disclosure proposes that the relay UE define a MUST mode specific DM-RS in order to provide information as to whether MUST transmission is performed to the eNB and the target UE.

For example, when it is assumed that a total of 12 DM-RS sequences is defined, DM-RS sequence #1 to DM-RS sequence #6 may be defined to be used for transmission only to the eNB and DM-RS sequence #7 to DM-RS sequence #12 may be defined to be used for MUST transmission. More specifically, in a situation in which the relay UE relays data of the primary UE to the eNB on a UL resource, if there is data to be transmitted to the target UE, the relay UE performs a MUST operation. In this case, the relay UE may perform MUST transmission by selecting one from among DM-RS sequence #7 to DM-RS sequence #12. In contrast, in a situation in which the relay UE relays the data of the primary UE to the eNB on a UL resource, if there is no data to be transmitted to the target UE, the relay UE performs transmission only to the eNB. In this case, the relay UE may select one from among DM-RS sequence #1 to DM-RS sequence #6.

For DM-RS selection, although the relay UE may randomly select the DM-RS, the relay UE may group the DM-RS into DM-RS sequence pairs as shown in Table 4 below and signal a sequence group index.

TABLE 4

| Sequence group index | DM-RS sequence pair index (transmission only to eNB, MUST transmission) |
|---|---|
| 1 | (1, 7) |
| 2 | (2, 8) |
| 3 | (3, 9) |
| 4 | (4, 10) |
| 5 | (5, 11) |
| 6 | (6, 12) |

When the eNB instructs the relay UE to relay the data of the primary UE, the eNB may designate the sequence group index using Table 4 above. For example, if the eNB designates the sequence group index as 2, the relay UE selects DM-RS sequence #2 for transmission only to the eNB and selects DM-RS sequence #8 for MUST transmission. Through this operation, the eNB or the target UE may reduce blind detection complexity of the DM-RS.

Even when the DM-RS is multiplexed as any scheme of code division multiplexing (CDM)/frequency division multiplexing (FDM)/time division multiplexing (TDM), the scheme shown in Table 4 may be applied.

Hereinbelow, a decoding procedure of the eNB or the target UE will be described.

The eNB or the target UE performs blind-detection on the DM-RS. For example, it is assumed that when the relay UE performs transmission only to the eNB, DM-RS sequence #3 is used and, when the relay UE performs MUST transmission, DM-RS sequence #10 is used. The eNB may recognize whether a DM-RS sequence is #3 or #10 by performing blind-detection on the DM-RS.

If the DM-RS is sequence #3, the eNB performs decoding on the assumption that there is only data thereof without performing MUST decoding. In contrast, if the DM-RS is sequence #10, the eNB recognizes that the data of the primary UE and sidelink data (i.e., data between the relay UE and the target data) to which the MUST scheme is applied have been transmitted and decodes the data of the primary UE based on the MUST scheme. For example, when hierarchical modulation is used, a power ratio between the data of the primary UE and the sidelink data may be predetermined or configured and the eNB decodes the data of the primary UE based on the power ratio.

If the DM-RS is sequence #3, the target UE stops performing decoding. However, if the DM-RS is sequence #10, the target UE decodes the sidelink data thereof through the same procedure as the procedure of the eNB.

Second Embodiment

As described above, in order to apply the MUST scheme, the relay UE should be aware of the power ratio between the data relayed to the eNB and the sidelink data transmitted to the target UE. To this end, additional signaling to the relay UE is needed. In particular, although the difference between receive power between the relay UE and the eNB and receive power between the relay UE and the target UE may continue to change, a method of instantaneously updating the power ratio every time a channel varies causes overhead. Therefore, the present disclosure proposes a method of semi-statically configuring the power ratio and using the configured power ratio.

The relay UE may selectively use a DM-RS with which an association relationship of the power ratio is defined. As an example, a DM-RS sequence table as shown in Table 5 below may be considered.

TABLE 5

| DM-RS sequence index (for MUST) | Power ratio (alpha) |
|---|---|
| 7 | 0.7 |
| 8 | 0.7 |
| 9 | 0.8 |
| 10 | 0.8 |
| 11 | 0.9 |
| 12 | 0.9 |

As shown in Table 5, the relay UE selects a DM-RS sequence index according to the power ratio for MUST transmission, i.e., the power ratio between the data of the primary UE and the sidelink data. The eNB and the target UE are aware of information regarding decoding as well. The power ratio may be known through measurement or feedback of power or energy of RSs received by the relay UE from the eNB and the target UE.

For example, as a result of comparison between power of the RSs received from the eNB and the target UE, if receive power of the RS received from the target UE is greater than receive power of the RS received from the eNB, superposition coding may be performed for MUST transmission by allocating higher power to the data of the primary UE and allocating the remaining power to the sidelink data.

Figure 10:
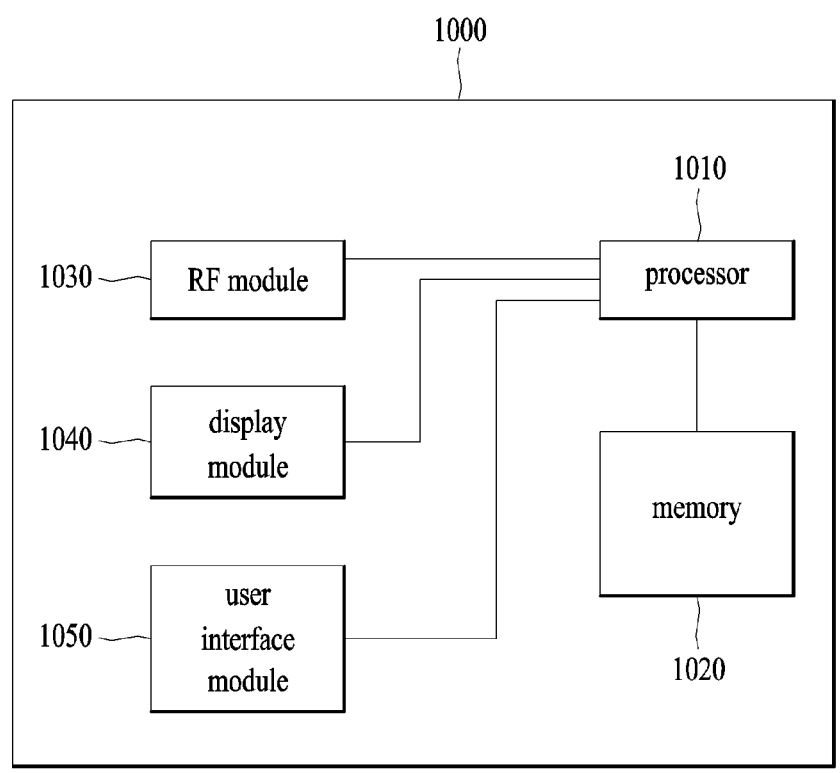
FIG. 10 is a block diagram of a communication apparatus according to an embodiment of the present disclosure.

FIG. 10 is a block diagram of a communication apparatus according to an embodiment of the present disclosure.

Referring to FIG. 10, a communication apparatus 1000 includes a processor 1010, a memory 1020, an RF module 1030, a display module 1040, and a User Interface (UI) module 1050.

The communication apparatus 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present disclosure described before with reference to the drawings. Specifically, for detailed operations of the processor 1010, the descriptions of FIGS. 1 to 13 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of transmitting an uplink relay signal by a relay user equipment (UE) in a wireless communication system, the method comprising:
    receiving relay data from a primary UE;
    generating the uplink relay signal by superposition-encoding the relay data and sidelink data according to a predetermined power ratio; and
    transmitting a superposition encoding specific reference signal sequence related with the power ratio and the uplink relay signal to a base station (BS) and a target UE,
    wherein, based on absence of the sidelink data to be transmitted to the target UE on sidelink, a relay specific reference signal sequence and the relay data are transmitted to the BS.

2. The method of claim 1, wherein the relay data is decoded by the BS from the uplink relay signal using the power ratio related with the superposition encoding specific reference signal sequence.

3. The method of claim 1, wherein the sidelink data is decoded by the target UE from the uplink relay signal using the power ratio related with the superposition encoding specific reference signal sequence.

4. The method of claim 1, further comprising receiving information about a combination of the relay specific reference signal sequence and the superposition encoding specific reference signals sequence from the BS.

5. The method of claim 1, further comprising selecting one superposition encoding specific reference signal sequence related with the power ratio from among two or more superposition encoding specific reference signal sequences.

6. A relay user equipment (UE) in a wireless communication system, the relay UE comprising:
    a wireless communication module; and
    a processor connected to the wireless communication module,
    wherein the processor receives relay data from a primary UE, generates an uplink relay signal by superposition-encoding the relay data and sidelink data according to a predetermined power ratio, and transmits a superposition encoding specific reference signal sequence related with the power ratio and the uplink relay signal to a base station (BS) and a target UE,
    wherein, based on absence of the sidelink data to be transmitted to the target UE on sidelink, the processor transmits a relay specific reference signal sequence and the relay data to the BS.

7. The relay UE of claim 6, wherein the relay data is decoded by the BS from the uplink relay signal using the power ratio related with the superposition encoding specific reference signal sequence.

8. The relay UE of claim 6, wherein the sidelink data is decoded by the target UE from the uplink relay signal using the power ratio related with the superposition encoding specific reference signal sequence.

9. The relay UE of claim 6, wherein the processor receives information about a combination of the relay specific reference signal sequence and the superposition encoding specific reference signals sequence from the BS.

10. The relay UE of claim 6, wherein the processor selects one superposition encoding specific reference signal sequence related with the power ratio from among two or more superposition encoding specific reference signal sequences.

* * * * *